(12) United States Patent
Li et al.

(10) Patent No.: US 10,335,913 B2
(45) Date of Patent: Jul. 2, 2019

(54) TEMPERATURE CONTROL SYSTEM FOR MACHINE TOOL

(71) Applicant: FANUC CORPORATION, Yamanashi (JP)

(72) Inventors: Zhenxing Li, Yamanashi-ken (JP); Hiroshi Minami, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/846,318

(22) Filed: Dec. 19, 2017

(65) Prior Publication Data
US 2018/0169812 A1 Jun. 21, 2018

(30) Foreign Application Priority Data
Dec. 21, 2016 (JP) ................. 2016-247801

(51) Int. Cl.
| | | |
|---|---|---|
| B23Q 11/14 | (2006.01) | |
| B23Q 11/12 | (2006.01) | |
| F24F 11/38 | (2018.01) | |
| G05B 19/042 | (2006.01) | |
| G05D 23/19 | (2006.01) | |

(52) U.S. Cl.
CPC .......... *B23Q 11/148* (2013.01); *B23Q 11/126* (2013.01); *F24F 11/38* (2018.01); *G05B 19/042* (2013.01); *G05D 23/1902* (2013.01)

(58) Field of Classification Search
CPC . B23Q 11/00; B23Q 11/0006; B23Q 11/0007; B23Q 11/10; B23Q 11/12; B23Q 11/123; B23Q 11/127; B23Q 11/128; B23Q 11/14; B23Q 11/145; B23Q 11/148;
(Continued)

(56) References Cited

U.S. PATENT DOCUMENTS

| | | | | |
|---|---|---|---|---|
| 5,150,994 A | * | 9/1992 | Hsu ........................ | B23B 31/263 384/241 |
| 6,675,549 B1 | * | 1/2004 | Kaneda .................. | B23Q 11/10 409/135 |
| 2009/0030560 A1 | | 1/2009 | Kawai et al. | |

FOREIGN PATENT DOCUMENTS

| | | |
|---|---|---|
| JP | 2002200539 A | 7/2002 |
| JP | 2004255494 A | 9/2004 |

(Continued)

OTHER PUBLICATIONS

English Abstract and Machine Translation for Japanese Publication No. 2009-248219 A, published Oct. 29, 2009, 8 pgs.

(Continued)

*Primary Examiner* — Jonathan Bradford
(74) *Attorney, Agent, or Firm* — Fredrikson & Byron, P.A.

(57) ABSTRACT

A temperature control system for a machine tool is equipped with a first temperature control device configured to control the temperature of gas supplied to a gas bearing, a second temperature control device configured to control the temperature of a room interior and to issue a notification of its own operation state to the outside, a gas supply section configured to supply gas whose temperature has been controlled by the first temperature control device, and a gas supply control section configured to perform the gas supply control of the gas supply section so that gas is distributed to both of the gas bearing and an interior space, when receiving the notification that the operation state of the second temperature control device is abnormal.

7 Claims, 3 Drawing Sheets

(58) Field of Classification Search
CPC ..... G05D 23/00; G05D 23/1902; F24F 11/32; F24F 11/38
See application file for complete search history.

(56) References Cited

FOREIGN PATENT DOCUMENTS

| JP | 2007185770 A | 7/2007 |
|---|---|---|
| JP | 200928827 A | 2/2009 |
| JP | 2009248219 A | 10/2009 |
| JP | 201017772 A | 1/2010 |
| JP | 2011143493 A | 7/2011 |

OTHER PUBLICATIONS

English Abstract for Japanese Publication No. 2009028827 A, published Feb. 12, 2009 2 pgs.
English Abstract and Machine Translation for Japanese Publication No. 2007-185770 A, published Jul. 26, 2007, 10 pgs.
English Abstract and Machine Translation for Japanese Publication No. 2004-255494 A, published Sep. 16, 2004, 5 pgs.
English Abstract and Machine Translation for Japanese Publication No. 2010-017772 A, published Jan. 28, 2010, 14 pgs.
English Abstract and Machine Translation for Japanese Publication No. 2002-200539 A, published Jul. 16, 2002, 19 pgs.
English Abstract and Machine Translation for Japanese Publication No. 2011-143493 A, published Jul. 28, 2011, 10 pgs.
English Machine Translation of Decision to Grant dated Jul. 10, 2018 issued by Japan Patent Office in JP Application No. 2016-247801, 3 pgs.
Untranslated Decision to Grant dated Jul. 10, 2018 issued by Japan Patent Office in JP Application No. 2016-247801, 3 pgs.
English Machine Translation of Notification of Refusal dated May 1, 2018 issued by Japan Patent Office in JP Application No. 2016-247801, 3 pgs.
Untranslated Notification of Refusal dated May 1, 2018 issued by Japan Patent Office in JP Application No. 2016-247801, 4 pgs.

\* cited by examiner

TEMPERATURE CONTROL SYSTEM FOR MACHINE TOOL

CROSS-REFERENCE TO RELATED APPLICATION

This application is based upon and claims the benefit of priority from Japanese Patent Application No. 2016-247801 filed on Dec. 21, 2016, the contents of which are incorporated herein by reference.

BACKGROUND OF THE INVENTION

Field of the Invention

The present invention relates to a temperature control system for a machine tool for controlling the ambient temperature of the machine tool provided in a room interior.

Description of the Related Art

Heretofore, there has been known a temperature control system for controlling the ambient temperature of a machine tool provided in a room interior. For example, there has been proposed a technology wherein a temperature control device is attached outside a cover surrounding a machine tool for supplying gas of an appropriate temperature toward an interior space of the cover by the use of the temperature control device (refer to Japanese Laid-Open Patent Publication No. 2007-185770).

SUMMARY OF THE INVENTION

However, Japanese Laid-Open Patent Publication No. 2007-185770 describes nothing about a method of coping with the case wherein anything abnormal takes place with the temperature control device in operation thereby becoming unable to supply the gas of the appropriate temperature. If such an abnormal situation were left to remain, the ambient temperature of the machine tool would rise to cause the machine tool or a workpiece to suffer from thermal displacement, and hence, it is liable to deteriorate the machining accuracy of the workpiece.

The present invention has been made to solve the aforementioned problem, and it is an object of the present invention to provide a temperature control system for a machine tool capable of restraining the deterioration in machining accuracy due to thermal displacement even where the operation state of a temperature control device becomes abnormal.

In an aspect of the present invention, a temperature control system for a machine tool for controlling an ambient temperature of the machine tool provided in a room interior comprises a cover surrounding the machine tool, a first temperature control device configured to control a temperature of gas supplied to a gas bearing possessed by the machine tool, a second temperature control device configured to control a temperature of the room interior and having a state notification function of issuing a notification of an operation state of the second temperature control device to outside, a gas supply section capable of supplying the gas bearing and an interior space of the cover with gas whose temperature has been controlled by the first temperature control device, and a gas supply control section configured to perform gas supply control of the gas supply section so that gas is distributed to both of the gas bearing and the interior space, when receiving the notification that the operation state is abnormal.

According to the present invention, it is possible to restrain the deterioration in machining accuracy due to thermal displacement even when the operation state of the temperature control device becomes abnormal.

The above and other objects, features, and advantages of the present invention will become more apparent from the following description when taken in conjunction with the accompanying drawings in which a preferred embodiment and several modifications of the present invention are shown by way of illustrative examples.

DESCRIPTION OF THE PREFERRED EMBODIMENTS

Hereinafter, a preferred embodiment of a temperature control system for a machine tool according to the present invention will be recited and described with reference to the accompanying drawings.

[Overall Configuration of Temperature Control System 10]

Figure 1:
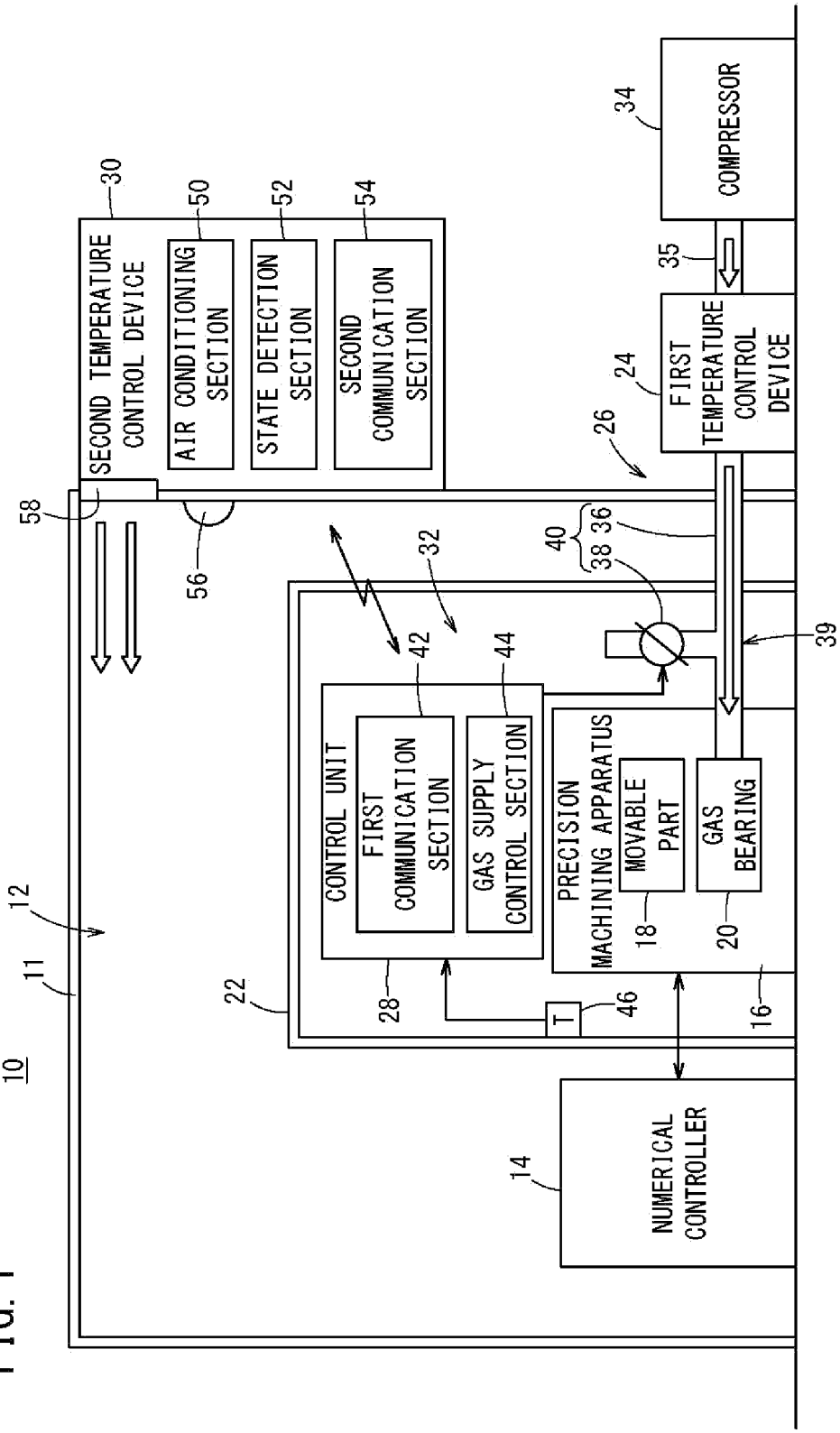
FIG. 1 is an overall block diagram of a temperature control system for a machine tool in one embodiment according to the present invention.

FIG. 1 is an overall block diagram of the temperature control system 10 for the machine tool in one embodiment according to the present invention. In a room interior 12 of a thermostatic chamber 11, there are provided a numerical controller 14 and a precision machining apparatus 16 (machine tool) connected to be communicatable with the numerical controller 14. This numerical controller 14 is a computer that performs desired sequence controls on the precision machining apparatus 16 by executing machining programs.

The precision machining apparatus 16 is a machine tool that performs machining processes in the order of nanometers on a workpiece (not shown). The precision machining apparatus 16 is configured to include mechanical sections for securing high machining accuracies, specifically a movable part 18 engaged in machining operations of the workpiece and a gas bearing 20 supporting a spindle on the movable part 18.

The temperature control system 10 is a system configured to control the ambient temperature of the precision machining apparatus 16 provided in the room interior 12. Specifically, the temperature control system 10 is equipped with a cover 22, a gas supply system 26 including a first temperature control device 24, a control unit 28 and a second temperature control device 30.

The cover 22 is provided to surround the precision machining apparatus 16 and the control unit 28. Thus, an interior space 32 having a roughly rectangular parallelepiped shape is defined inside the cover 22. The cover 22 may take a structure that is sealed from the room interior 12 or may take a structure that opens partly to the room interior 12.

The gas supply system 26 is configured by a compressor 34, a pipe 35, the first temperature control device 24, a branch pipe 36, and a valve 38 in order from an upper stream side (the outside of the thermostatic chamber 11). The first temperature control device 24 is configured to include a filter, a cooling coil, and a heating coil, and is a device configured to control the temperature of gas (herein, air) supplied to the gas bearing 20 possessed by the precision machining apparatus 16.

The branch pipe 36 has one inlet communicating with the first temperature control device 24 and two outlets communicating respectively with the gas bearing 20 and the interior space 32. The valve 38 capable of being opened and closed is provided in a section between a branch position 39 of the branch pipe 36 and the outlet communicating with the interior space 32. That is, the branch pipe 36 and the valve 38 correspond to a gas supply section 40 (gas supply means) capable of supplying the gas bearing 20 and the interior space 32 with gas whose temperature has been controlled by the first temperature control device 24.

The control unit 28 is a device that performs a control (hereinafter as gas supply control) regarding a gas supply operation of the gas supply section 40. Specifically, the control unit 28 is equipped with a first communication section 42 configured to wirelessly communicatable with devices of the outside and a gas supply control section 44 configured to perform the opening/closing control of the valve 38. The control unit 28 is capable of acquiring the temperature of the interior space 32 indicated by a detection signal which is acquired from a temperature sensor 46 within the cover 22.

The second temperature control device 30 is configured to control the temperature of the room interior 12 and has a state notification function of issuing a notification of its own operation state to the outside. Specifically, the second temperature control device 30 is equipped with an air conditioning section 50, a state detection section 52, a second communication section 54, a pilot lamp 56, and an outlet port 58.

The air conditioning section 50 is constructed to include a filter, a cooling coil, a heating coil, and a humidifier, and has air conditioning and humidifying functions of controlling the temperature and humidity of the air introduced. That is, the air conditioning section 50 controls the temperature and humidity of the air introduced, and thereafter releases the air through the outlet port 58 toward the room interior 12.

The state detection section 52 is configured to detect whether the air conditioning section 50 is operating normally or not. For example, when the temperature/humidity of the air to be released deviates from control ranges or when the air conditioning section 50 is out of order, the state detection section 52 detects that the operation state of the second temperature control device 30 is abnormal.

The second communication section 54 is configured to be wirelessly communicatable with devices of the outside, and transmits a signal (hereinafter called a status signal) indicating a detection result from the state detection section 52, periodically or unperiodically toward the outside. The pilot lamp 56 is a lamp that emits a light in a different display mode (ON/OFF, flashing cycle, color, or brightness, for example) in dependence on the operation state of the second temperature control device 30.

[Operation of Temperature Control System 10]

<A. When Second Temperature Control Device 30 is in Normal Operation>

Next, with reference to FIG. 1, description will be given regarding the operation of the temperature control system 10 when the operation state of the second temperature control device 30 is "normal". After detecting by the state detection section 52 that the operation state of its own second temperature control device 30 is normal, then using the second communication section 54 and the pilot lamp 56, the second temperature control device 30 issues a notification to the room interior 12 that the operation state is "normal". For example, the second communication section 54 transmits a status signal indicative of a normal state to the room interior 12, while the pilot lamp 56 performs a light emitting operation (light emission OFF in the example in FIG. 1) in a display mode indicating the normal state.

The control unit 28 receives the status signal indicative of the "normal" state from the second temperature control device 30 through the first communication section 42. Then, the gas supply control section 44 performs the gas supply control to supply gas only to the gas bearing 20 by keeping the valve 38 of the gas supply section 40 in a "closed" state. In this case, air from the outside is compressed by the compressor 34 and supplied to the first temperature control device 24 through the pipe 35, to be controlled in temperature by the first temperature control device 24, and supplied only to the gas bearing 20 through the branch pipe 36.

On the other hand, because the second temperature control device 30 is operating normally, the air released through the outlet port 58 circulates in the room interior 12 with the temperature or humidity remaining controlled. Thus, the second temperature control device 30 controls the ambient temperature of the precision machining apparatus 16 indirectly through the cover 22 (or directly).

Incidentally, although in the foregoing example, the second temperature control device 30 issues a notification to the room interior 12 that its own operation state is "normal", the second temperature control device 30 may be set not to transmit the status signal toward the room interior 12 in the case of a normal state. In this case, on the ground of not receiving a status signal of being "abnormal" referred to later, the control unit 28 can determine that the operation state of the second temperature control device 30 is "normal".

<B. When Second Temperature Control Device 30 is in Abnormal Operation>

Next, with reference to FIG. 2, description will be given regarding the operation of the temperature control system 10 when the operation state of the second temperature control device 30 is "abnormal".

Figure 2:
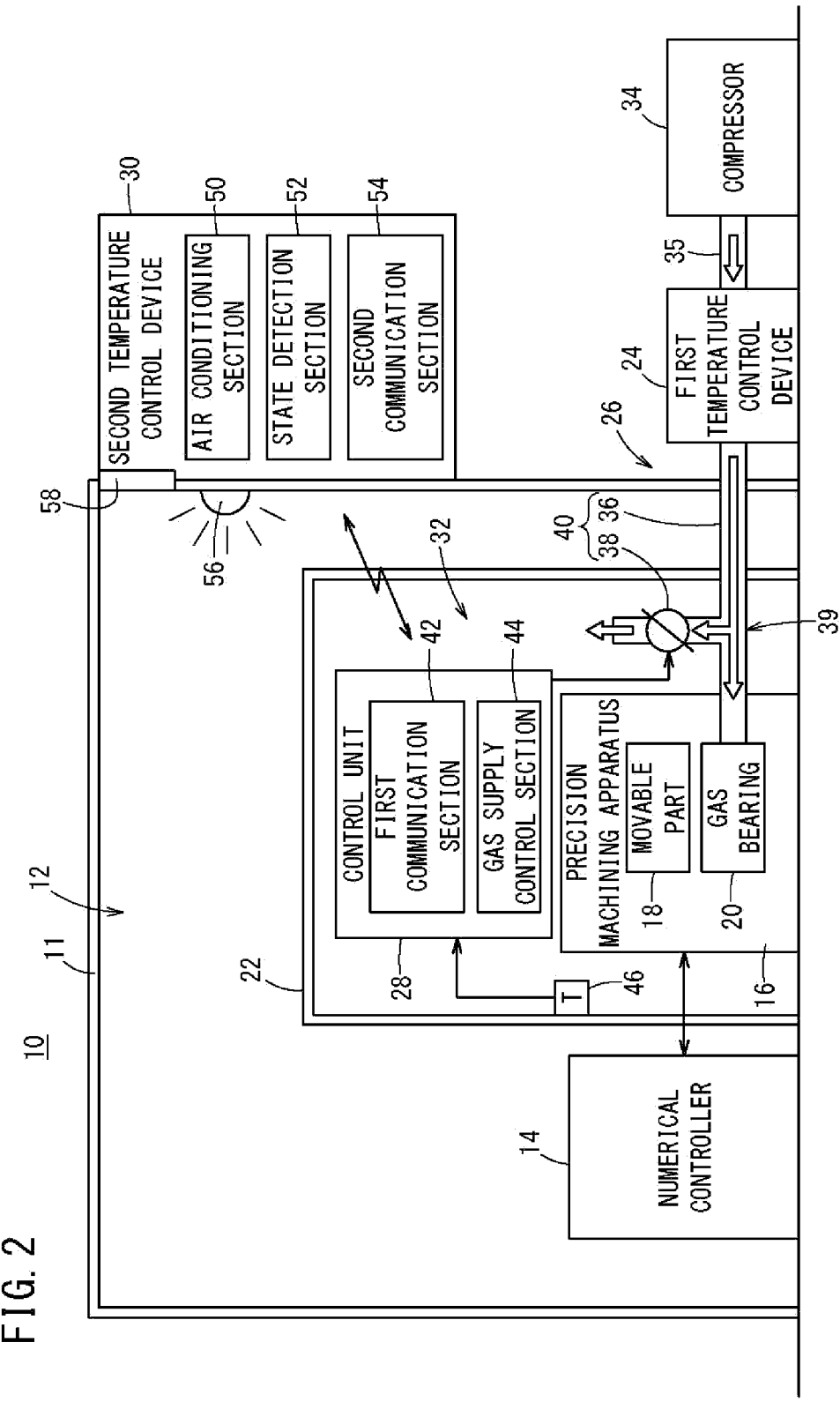
FIG. 2 is a block diagram showing a gas supply state when a second temperature control device is abnormal.

As shown in FIG. 2, after detecting by the state detection section 52 that the operation state of its own second temperature control device 30 is abnormal, then using the second communication section 54 and the pilot lamp 56, the second temperature control device 30 issues a notification to the room interior 12 that the operation state is "abnormal". For example, the second communication section 54 transmits a status signal indicative of being abnormal toward the room interior 12, while the pilot lamp 56 performs a light emitting operation (light emission ON in the example in FIG. 2) in a display mode indicating the abnormal state.

The control unit 28 receives the status signal indicative of being "abnormal" from the second temperature control device 30 through the first communication section 42. Then, the gas supply control section 44 performs a gas supply control to distribute gas to both of the gas bearing 20 and the interior space 32 by keeping the valve 38 of the gas supply section 40 in an "open" state (a full open or intermediate state). In this case, a part of the air from the first temperature control device 24 is supplied to the gas bearing 20 through the branch position 39 of the branch pipe 36. On the other hand, the remaining air is branched from the branch position 39 to be supplied to the interior space 32 after passing through the valve 38.

Here, the first temperature control device 24 and the second temperature control device 30 control the temperatures to be respective target values. The target values are considered to be equal to each other within an allowable range (the difference value being 1° C. or below, for example). Therefore, it is possible to keep the ambient temperature of the precision machining apparatus 16 substantially constant even when gas supply is carried out from any of the first temperature control device 24 and the second temperature control device 30 in dependence on changes in the operation state.

Further, the gas supply control section 44 performs a gas supply control in which the distribution quantity or distribution ratio of gas differs in dependence on the temperature detected by the temperature sensor 46. Specifically, the gas supply control section 44 performs a gas supply control [1] to increase the distribution quantity to the interior space 32 as the deviation from the target value (temperature difference) increases, or [2] to increase the distribution ratio (the opening degree of the valve 38, for example) to the interior space 32 as the temperature difference increases. Therefore, it is possible to supply the gas appropriately to the temperature that is actually detected at the precision machining apparatus 16 or the interior space 32.

<C. When Second Temperature Control Device 30 is Restored>

Next, with reference to FIG. 1 and FIG. 2, a description will be given regarding the operation of the temperature control system 10 when the operation state of the second temperature control device 30 is returned from the "abnormal" state to the "normal" state. After detecting by the state detection section 52 that the operation state of its own second temperature control device 30 has been restored to the normal state, the second temperature control device 30 uses the second communication section 54 and the pilot lamp 56 to issue a notification to the room interior 12 that the second temperature control device 30 is restored. For example, the second communication section 54 again transmits the status signal indicative of being normal toward the room interior 12, while the pilot lamp 56 again performs the light emitting operation in the display mode indicating the normal state (light emission OFF in the example in FIG. 1).

The control unit 28 receives the status signal indicative of being "normal" from the second temperature control device 30 through the first communication section 42. Then, by switching the valve 38 from the "open" state to the "closed" state, the gas supply control section 44 performs a gas supply control to discontinue supplying the gas to the interior space 32 and to supply the gas to the gas bearing 20 only. Therefore, while the gas supply to the precision machining apparatus 16 is continued as it is, the subject of temperature control is automatically switched from the first temperature control device 24 to the second temperature control device 30.

Here, the gas supply control section 44 performs the gas supply control to continue supplying the gas to the interior space 32 until a predetermined period of time (a period of 5 to 30 minutes, for example) has elapsed from the time of receiving the status signal indicative of the return to the "normal" state. Therefore, it is possible to smoothly shift the subject of temperature control, after the temperature in the room interior 12 comes close to the temperature in the interior space 32.

Incidentally, although in the aforementioned example, the second temperature control device 30 issues a notification to the room interior 12 that the operation state of its own has returned to the "normal" state, a setting may be made so as not to transmit the status signal to the room interior 12 when returned to the normal state. In this case, on the ground that the status signal indicative of being "abnormal" is not received any more, the control unit 28 can determine that the operation state of the second temperature control device 30 has returned to the "normal" state.

Modifications

Next, modifications (first through fourth examples) of the foregoing embodiment will be described. Incidentally, components being the same as those in the temperature control system 10 will be given the same reference numerals and will occasionally be omitted from being described.

First Example

Figure 3:
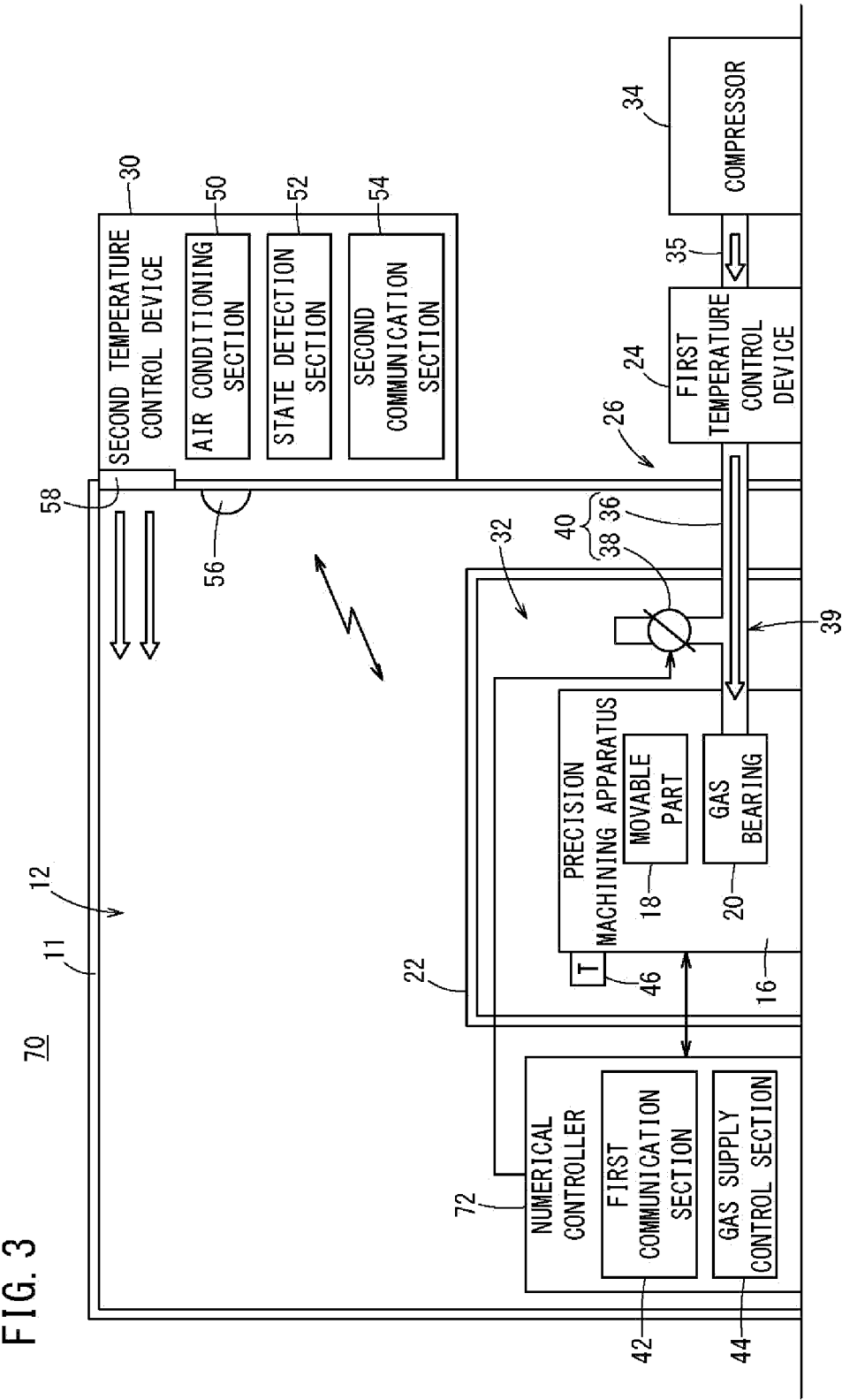
FIG. 3 is an overall block diagram of a temperature control system for a machine tool in a modification.

FIG. 3 is an overall block diagram of a temperature control system 70 for a machine tool in a modification. This temperature control system 70 differs from the temperature control system 10 (refer to FIG. 1) mainly [1] in the absence of the control unit 28 and [2] in the configuration/function of a numerical controller 72.

The numerical controller 72 is further equipped with the first communication section 42 and the gas supply control section 44 in addition to various functions with which the numerical controller 14 (refer to FIG. 1) is equipped. The numerical controller 72 is connected to the valve 38 of the gas supply section 40 and acquires the detection signal from the temperature sensor 46 attached to the precision machining apparatus 16, so that the numerical controller 72 is able to acquire the temperature of the precision machining apparatus 16 indicated by the detection signal.

In this case, in place of the control unit 28 in FIG. 1, the numerical controller 72 receives the status signal from the second temperature control device 30 and performs the open/close control of the valve 38 in dependence on the operation state of the second temperature control device 30 or the temperature of the precision machining apparatus 16. Even in the configuration like this, it is possible to obtain the operational advantage equivalent to that of the temperature control system 10 (FIG. 1).

Second Example

In the present embodiment, the control unit 28 and the second temperature control device 30 perform the transmission and reception of the status signal by the use of wireless communication. However, the way of receiving the notification from the second temperature control device 30 is not limited to this form. For example, wired communication may be employed or communication may be carried out via another communication device (a control board of the second temperature control device 30, for example). Further, the state notification function of the second temperature control device 30 may output not only a radio wave for communication but also sound and/or light, for example. In this case, the control unit 28 receives the notification from the second temperature control device 30 by the use of a microphone capable of detecting sounds from a speaker or a camera capable of detecting light from the pilot lamp 56.

Third Example

Although in the present embodiment, the distribution of gas is performed in the case of the abnormal operation state, the condition for execution is not limited to this. For example, when the temperature detected by the temperature sensor 46 deviates from a control range (±0.5° C. or below relative to a target value, for example), the gas supply control section 44 may perform the gas supply control for distributing the gas without depending on the result of the notification. Therefore, it is possible to reliably restrain the occurrence of thermal displacement based on the temperature actually detected at the precision machining apparatus 16 or the interior space 32.

Fourth Example

Although in the present embodiment, description has been given with the precision machining apparatus 16 taken as an example, the kind of machine tool is not limited if the tool has a gas bearing. For example, a machining center or a lathe may be provided instead of the precision machining apparatus 16.

Description of Operational Advantages

As described above, this temperature control system 10 (70) is the system for controlling the ambient temperature of the precision machining apparatus 16 (machine tool) provided in the room interior 12 and is equipped with [1] the cover 22 surrounding the precision machining apparatus 16, [2] the first temperature control device 24 configured to control the temperature of the gas supplied to the gas bearing 20 possessed by the precision machining apparatus 16, [3] the second temperature control device 30 configured to control the temperature of the room interior 12 and having the state notification function of issuing a notification of its own operation state to the outside, [4] the gas supply section 40 capable of supplying the gas bearing 20 and the interior space 32 of the cover 22 with the gas whose temperature has been controlled by the first temperature control device 24, and [5] the gas supply control section 44 configured to perform the gas supply control of the gas supply section 40 so that gas is distributed to both of the gas bearing 20 and the interior space 32, when receiving the notification that the operation state of the second temperature control device 30 is abnormal.

In this manner, when the notification that the operation state of the second temperature control device 30 is abnormal is received, gas supply is carried out to be distributed to both of the gas bearing 20 and the interior space 32. Thus, the subject of temperature control is automatically switched from the second temperature control device 30 to the first temperature control device 24 while the gas supply to the precision machining apparatus 16 (that is, the operation of the precision machining apparatus 16) is continued as it is. Therefore, it is possible to restrain the deterioration in machining accuracy due to thermal displacement even when the operation state of the second temperature control device 30 becomes abnormal.

Further, when the notification that the operation state is abnormal is not received any more, the gas supply control section 44 may perform the gas supply control to discontinue supplying the gas to the interior space 32 and to supply the gas to the gas bearing 20 only. Thus, the subject of temperature control is automatically switched from the first temperature control device 24 to the second temperature control device 30 while the gas supply to the precision machining apparatus 16 is continued as it is.

Further, the gas supply control section 44 may perform the gas supply control to continue supplying the gas to the interior space 32 until a predetermined period of time has elapsed from the time when the notification that the operation state is abnormal was not received any more. Thus, it is possible to shift the subject of temperature control smoothly after the temperature of the room interior 12 comes satisfactorily close to the temperature of the interior space 32.

Further, the temperature control system 10 (70) is further equipped with the temperature sensor 46 configured to detect the temperature of the precision machining apparatus 16 or the interior space 32, and when the temperature detected by the temperature sensor 46 deviates from the control range, the gas supply control section 44 may perform the gas supply control to distribute the gas regardless of whether or not the notification that the operation state is abnormal is received. Thus, it is possible to restrain the occurrence of thermal displacement reliably based on the temperature actually detected at the precision machining apparatus 16 or the interior space 32.

Further, the gas supply control section 44 may perform the gas supply control in which the distribution quantity or the distribution ratio of gas differs in dependence on the temperature detected by the temperature sensor 46. Thus, it is possible to supply the gas appropriately to the temperature actually detected at the precision machining apparatus 16 or the interior space 32.

Further, the first temperature control device 24 and the second temperature control device 30 may control respective temperatures to be respective target values, and the target values are considered to be equal to each other within the allowable range. Thus, it is possible to keep the ambient temperature of the precision machining apparatus 16 substantially constant even when the gas is supplied from any of the first temperature control device 24 and the second temperature control device 30 in dependence on the changes in the operation state.

Further, the gas supply section 40 may be configured to include the branch pipe 36 with the inlet and the outlets. The inlet communicates with the first temperature control device 24 and the outlets communicate respectively with the gas bearing 20 and the interior space 32. The valve 38 is provided in the section between the branch position 39 of the branch pipe 36 and the outlet communicating with the interior space 32, and the gas supply control section 44 may perform the opening-degree control of the valve 38 as the gas supply control.

REMARKS

Incidentally, the present invention is not limited to the foregoing embodiment and the foregoing modifications, and as a matter of course, can be altered arbitrarily without departing from the gist of the present invention. Alternatively, various components may arbitrarily be combined unless discrepancy arises technologically.

What is claimed is:

1. A temperature control system for a machine tool for controlling an ambient temperature of the machine tool provided in a room interior, the system comprising:
   a cover surrounding the machine tool;
   a first temperature control device configured to control a temperature of gas supplied to a gas bearing possessed by the machine tool;
   a second temperature control device configured to control a temperature of the room interior and having a state notification function of issuing a notification of an operation state of the second temperature control device to outside;

a gas supply controller capable of supplying the gas bearing and an interior space of the cover with the gas whose temperature has been controlled by the first temperature control device; and a gas supply control section configured to perform gas supply control of the gas supply section so that gas is distributed to both of the gas bearing and the interior space, when receiving the notification that the operation state is abnormal.

2. The temperature control system according to claim 1, wherein when the notification that the operation state is abnormal is not received any more, the gas supply control section is configured to perform the gas supply control to discontinue supplying the gas to the interior space and to supply the gas to the gas bearing only.

3. The temperature control system according to claim 2, wherein until a predetermined period of time has elapsed from a time when the notification that the operation state is abnormal was not received any more, the gas supply control section is configured to perform the gas supply control to continue supplying the gas to the interior space.

4. The temperature control system according to claim 1, further comprising a temperature sensor configured to detect a temperature of the machine tool or the interior space, wherein when the temperature detected by the temperature sensor deviates from a control range, the gas supply control section is configured to perform the gas supply control to distribute the gas regardless of whether or not the notification that the operation state is abnormal is received.

5. The temperature control system according to claim 1, further comprising a temperature sensor configured to detect a temperature of the machine tool or the interior space, wherein the gas supply control section is configured to perform the gas supply control in which a distribution quantity or a distribution ratio of the gas differs in dependence on the temperature detected by the temperature sensor.

6. The temperature control system according to claim 1, wherein the first temperature control device and the second temperature control device are configured to control temperatures to be respective target values, wherein a difference value between the target values is set to be within an allowable range.

7. The temperature control system according to claim 1, wherein the gas supply section comprises:

a branch pipe that includes an inlet and outlets, the inlet communicating with the first temperature control device, and the outlets communicating respectively with the gas bearing and the interior space; and a valve provided in a section between a branch position of the branch pipe and the outlet communicating with the interior space, and wherein the gas supply control section is configured to perform an opening-degree control of the valve as the gas supply control.

* * * * *